March 6, 1962 L. W. JOHNSON 3,023,817
POWER ACTUATED HITCH DEVICE
Original Filed Jan. 27, 1958 3 Sheets-Sheet 1

INVENTOR.
LESLIE W. JOHNSON
BY
Roger C. Johnson
ATTORNEYS

March 6, 1962 L. W. JOHNSON 3,023,817
POWER ACTUATED HITCH DEVICE
Original Filed Jan. 27, 1958 3 Sheets-Sheet 3

INVENTOR.
LESLIE W. JOHNSON
BY
*Roger C. Johnson*
ATTORNEYS

United States Patent Office 3,023,817
Patented Mar. 6, 1962

3,023,817
POWER ACTUATED HITCH DEVICE
Leslie W. Johnson, Moline, Ill., assignor, by mesne assignments, to Deere & Company, a corporation of Delaware
Original application Jan. 27, 1958, Ser. No. 711,242. Divided and this application Jan. 18, 1960, Ser. No. 3,114
6 Claims. (Cl. 172—274)

This application is a division of my copending application, Ser. No. 711,242, filed January 27, 1958 for Cotton Planter.

The present invention relates generally to agricultural implements and more particularly to implements of the type that are adapted to be mounted on a farm tractor.

The object and general nature of the present invention is the provision of a tractor mounted planter that is so constructed and arranged as to be readily attachable to the tractor merely by backing the tractor into position relative to the implement and then connecting the rear portion of the implement with the power lift system of the tractor, after which operating the power lift means acts automatically to connect the implement in draft-receiving relation therewith, all without the operator dismounting from his station on the tractor.

These and other objects and advantages of the present invention will be apparent to those skilled in the art after a consideration of the following detailed description of the preferred structure in which the principles of the present invention have been incorporated. In the accompanying drawings.

Figure 1:
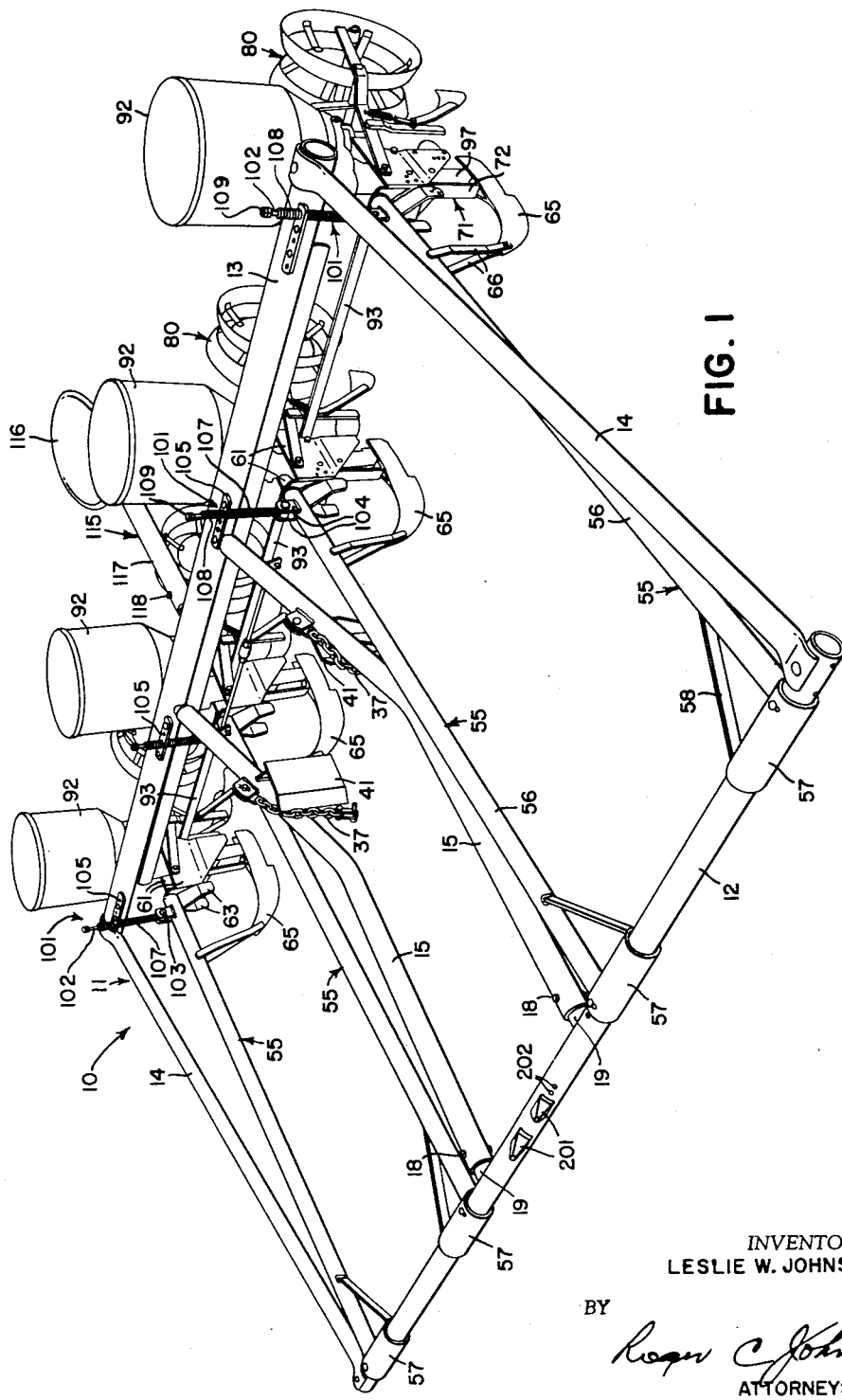
FIG. 1 is a perspective view of a four-row planter of the integral or tractor mounted type, the planter being shown in a position detached from the tractor.
Figure 2:
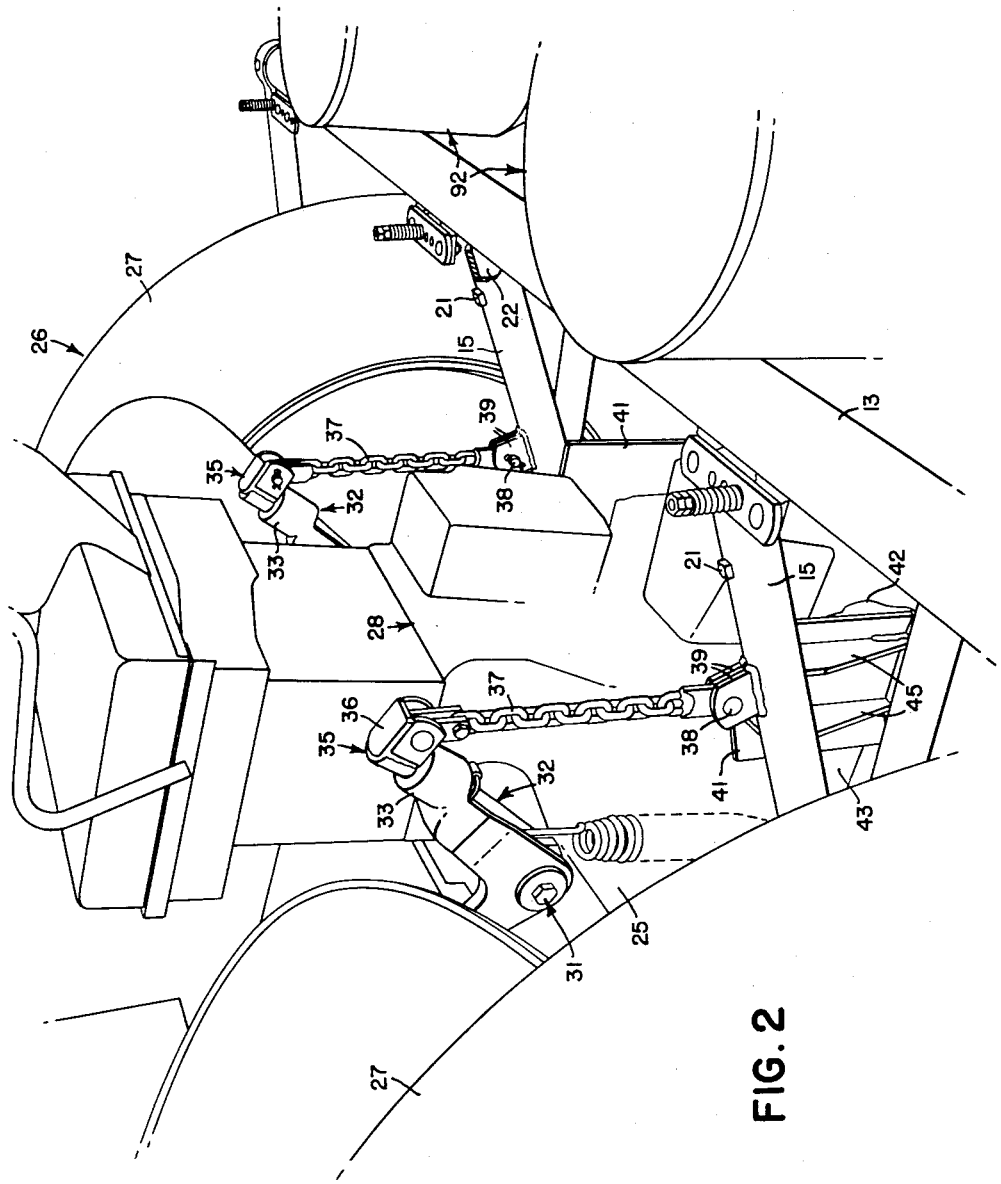
FIG. 2 is an enlarged fragmentary view showing certain details of the means connecting the rear portion of the planter with the associated tractor.

Referring first to FIG. 1, the principles of the present invention have been shown as embodied in a four-row integral planter indicated in its entirety by the reference numeral 10. The planter comprises a tractor-carried frame 11 that includes a front transverse bar 12 and a rear transverse bar 13, the transverse bars being rigidly interconnected by a pair of outer fore-and-aft extending bars 14 and a pair of inner generally fore-and-aft extending bars 15. The front and rear transverse bars 12 and 13, and the other bars 14 and 15, preferably are in the form of pipes or tubular members. The forward ends of the central fore-and-aft extending numbers 15 are connected by bolts 18 to short stubs 19 that are welded or otherwise fixedly attached to the generally central portion of the front transverse bar 12. The rear ends of the pipes 15 are bolted, as at 21 in FIG. 2, to forwardly extending stubs 22 welded or otherwise firmly attached to the central portion of the rear transverse bar 13. As will best be seen in FIG. 1, the central portions of the middle bars or pipe members 15 are bent downwardly to pass under the rear axle housings 25 of the tractor, which is indicated in its entirety by the reference numeral 26 in FIG. 2.

The tractor 26 is generally of conventional construction so far as the features of the present invention are concerned, the tractor having the usual drive wheels 27 carried by the usual axle shafts extending through the rear axle housings 25. Also, the tractor 26 is provided with power lift mechanism indicated in its entirety by reference numeral 28. This mechanism includes a transverse rockshaft 31 that extends across the rear of the tractor and which carries a lift arm 32 at each end. The outer end of each lift arm 32 is formed with a generally cylindrical section 33 that is adapted to receive a chain attachment plug 35. Each attachment plug 35 includes a head section 36 to which the upper end of the lifting chain 37 is connected. The lower end of each chain 37 extends downwardly from the associated lift arm 32 and is connected by detachable pin means 38 to apertured lugs 39 welded to the rear portions of the center pipe members 15. These portions of the center members 15, as best shown in FIG. 1, carry rub plates 41 that are adapted to bear against abutment castings 42 that are fixed to the drawbar support 43 of the tractor. Preferably, the rub plates 41 are reinforced by vertical members 45 welded to each plate 41 and also to the associated pipe member 15.

Referring again to FIG. 1, the implement of this invention includes a plurality of furrow opener units, each indicated by the numeral 55, that are swingably connected with the front transverse frame member 12 and extend below and generally rearwardly of the rear frame member 13. Each of the furrow opener units 55 includes a fore-and-aft extending pipe member 56 that is secured, as by welding, to a transverse sleeve 57 rockably disposed on the front cross bar 12. Each of the sleeve members 57 is reinforced by diagonal brace 58 welded to one end of the sleeve and to the adjacent portion of the associated pipe member 56. Secured to the rear end of each of the pipe members 56, as by welding, is a pair of bracket plates 61 (FIG. 1) that extend generally rearwardly from the rear end of the pipe 56, and welded to each pair of plates 61, and also to the rear portion of the pipe 56, is a pair of downwardly extending bars 63 which form a yoke that acts with the bracket plates 61 to receive any one of several furrow opener or ground working means.

As best shown in FIG. 1, one of such ground working or furrow opening means may take the form of a runner 65 that may be conventional per se so far as the principles of the present invention are concerned. The forward end of each runner 65 is connected by a pair of straps 66 to the associated pipe member 56, the straps 66 being connected to the latter and to the forward or upper end of the associated runner by any suitable means. The rear portion of each runner 65 includes a rear cross block (not shown) to which the lower end of an L-shaped bracket 71 is connected by any suitable means. At its upper end the aforesaid bracket 71 is connected by bolt means 72 or other suitable fastener to the bracket plates 61. Disposed rearwardly of each runner 65 is a press wheel unit 80.

A hopper support casting is connected in any suitable way to the bracket plates 61 and carries a seed hopper 92. The weight of the hopper and contents is imposed directly on the rear end of the pipe or drawbar 56 so that this weight ensures the penetration of the runner 65 to the desired depth. The rear portions of the furrow opener units, each of which includes a pipe or drawbar 56, are interconnected by cross bars 93, best shown in FIG. 1, the ends of the bars 93 being connected in any suitable way to suitable lugs or the like at the rear portions of the bracket plates 61. Each hopper 92 includes conventional seed dispensing means driven from the associated press wheel 81 by suitable drive chain means. Seed dispensed by the above mentioned dispensing means in the hoppers 92 is delivered into associated spout sections from which the seed falls through seed tubes 97 (FIG. 1) into the furrows made by the associated runners 65.

Each furrow opener unit 55 is independently connected with the rear frame pipe 13 by a lifting and cushioning means 101. The latter includes a rod 102 swingably connected by trunnion means 103 with a pair of apertured lugs 104 fixed, as by welding, to the rear portion of the pipe 56. The upper end of the rod 102 extends through one of several openings provided in a bracket 105 fixed to the adjacent portion of the rear frame pipe member 13. A pressure spring 107 is disposed between the lugs 104 and the associated bracket 105, and a cushioning spring 108 is disposed between the upper side of the bracket 105 and a pair of lock nuts 109 carried at the upper end of the rod 102, the upper end of which is threaded to receive the lock nuts 109. Thus, when the power lift 28 of the tractor is actuated to lift the rear end of the frame 11, the rear ends of all of the units 55 are raised through the associated lifting and cushioning means 101. The springs 108 serve to protect the frame 11 against impact shocks that may occur when the outfit is moved in a raised or transport position over rough ground or the like. In operation, if desired, the weight of the rear portion of the frame 11 may be added to the several furrow opener units 55 by lowering the lift arms 32, whereupon the rear portion of the frame 11 is lowered against the springs 107, thus adding the weight of the rear portion of the frame to the several furrow opener units to insure proper penetration of the associated furrow openers. The frame 11 also carries a station 115 adapted to carry an auxiliary operator, for example, one whose duty it is to watch the operation of the several seed dispensing means. This unit includes a seat 116 and a seat supporting member 117 in the form of a pipe the forward end of which is connected, as at 118, to a short pipe section (not shown) welded to the central portion of the rear frame pipe 13 and arranged to extend rearwardly in a generally horizontal position. The operator supported on the seat 116 is in a position to conveniently check the operation of the several planting units and to make any adjustment of any of the press wheels. He is also in a position to operate the tractor power lift means 28 if it should be desired to relieve the driver of the tractor of this duty. Further, when the frame 11 is lowered to impose the weight thereof onto the furrow openers, as when operating under difficult penetrating conditions, the weight of the operator or watcher on the support 115 is also added to the furrow opener, this added weight being imposed at a mechanical advantage due to the rearwardly extended position of the seat 116 and the seat support 117.

According to the principles of the present invention, the attachment of the planter to the tractor is easily, simply and quickly accomplished. FIG. 1 shows the implement of the present invention supported on the ground and ready to receive the tractor. The latter is backed into the implement, with the rear wheels 27 passing over the end portions of the front frame part 12 and in between the furrow opener frame bars 56. When the tractor has been backed an amount sufficient to bring the sway limit castings 42 into position between the rub plates 41, the operator reaches down, picks up the lift chains 37 and, with the power lift arms 32 lowered, inserts the attaching plugs 35 in the outer ends of the arms 32. He then actuates the power lift unit to raise the arms 32 substantially into the positions shown in FIG. 2. The lift chains 37 are connected to the center frame bars 15 at points well forward of the center of gravity of the implement, and therefore the initial movement of the power lift arms acts to raise the front frame pipe 12 up against the bottom of the tractor. According to the present invention, I make use of this action to effect an automatic draft-transmitting connection with the tractor by virtue of automatic latch means that will now be described.

Figure 3:
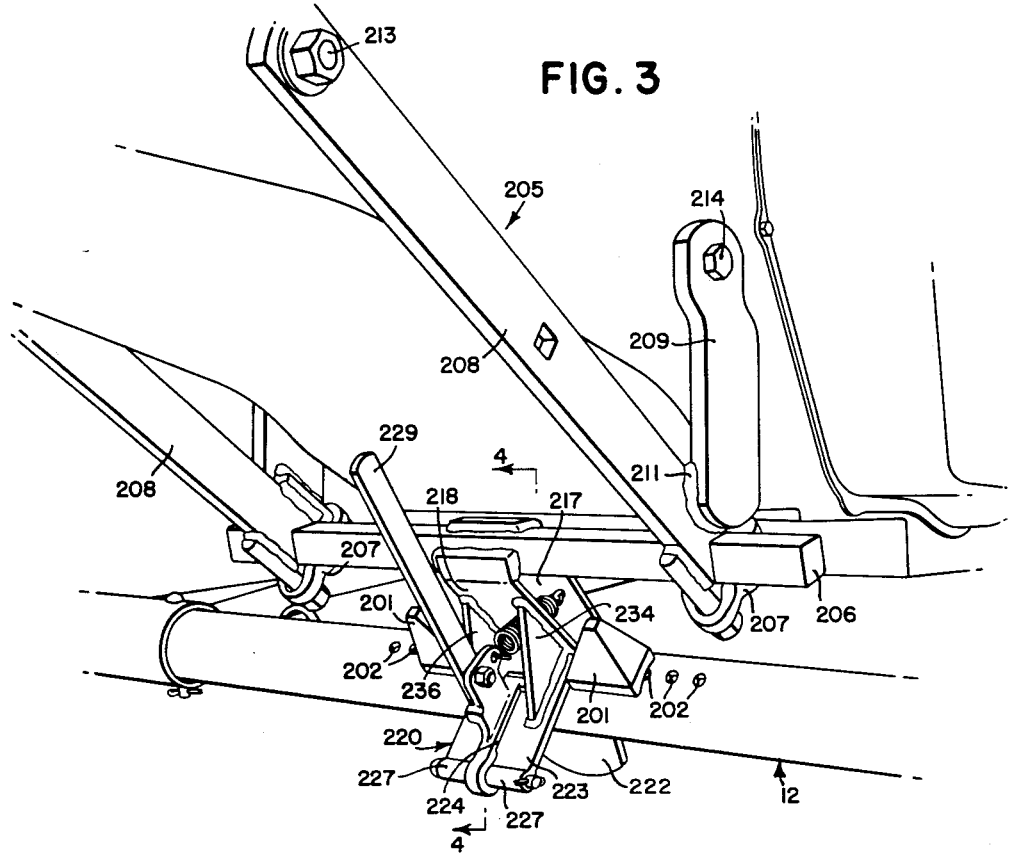
FIG. 3 is an enlarged fragmentary perspective view showing the means for connecting the front portion of the implement with the generally central lower portion of the tractor in draft-receiving relation.
Figure 4:
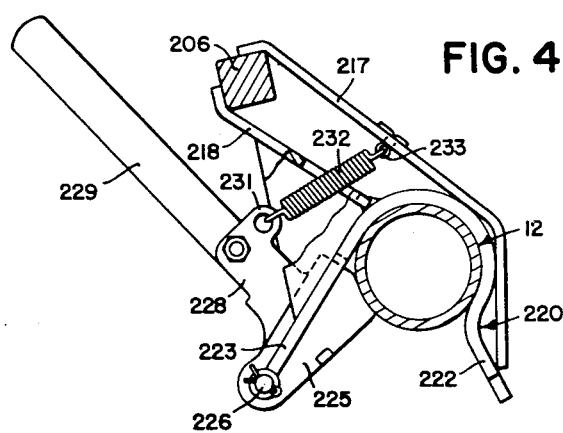
FIG. 4 is a sectional view taken at an enlarged scale along the line 4—4 of FIG. 3.

Referring to FIGS. 1, 3 and 4, it will be seen that the central portion of the front frame pipe 12 carries a pair of guide blocks 201 which are secured to the central portion of the front frame member 12 by means extending through selected openings of a plurality of openings 202 formed in the pipe 12. Fixed to the lower portion of the tractor approximately midway between the front and rear wheels thereof is a latch-supporting bracket structure indicated in its entirety by the reference numeral 205. This structure comprises a cross bar 206, preferably square in cross section and removably clamped by suitable means 207 to the rear lower ends of a pair of straps 208, which ends are notched to receive the bar 206. The straps 208 have struts 209 welded thereto, as indicated at 211, and the upper ends of the straps 208 and the struts 209 are apertured to receive attaching bolt means 213 and 214. Normally this bracket structure can remain on the tractor more or less as a permanent attachment thereto since it does not interfere with the mounting of most other tractor-carried or tractor-connected implements. As shown in FIG. 4, a pair of downwardly and rearwardly extending plates 217 and 218 are secured, as by welding, to the central portion of the attaching bar 206. The plates 217 and 218 receive a generally U-shaped downwardly facing socket member 220, the rear portion 222 of which extends downwardly and rearwardly and the front portion 223 of which extends downwardly and forwardly and is provided centrally with a T slot 224 in which a pivoted latch member 225 is disposed. The latch member 225 is swingably supported on a pin 226 that is carried by a sleeve section 227 secured to or forming a part of the front socket section 223. Preferably, the latch 225 is in the form of a casting and is provided with a vertically extending lug 228 to which an operating handle 229 is bolted. The casting 225 includes an apertured portion 231 in which a spring 232 is connected, the rear end of the spring being anchored to the bracket plate 217 by a cotter 233 or other suitable means. As best seen in FIG. 3, the forward section 223 of the socket member 220 is reinforced by gusset plates 234 and 236 welded to the socket section 223 and to the adjacent portions of the bracket plate 218. The spring 232 extends between the gusset members 234 and 236.

When the implement is connected to the tractor in the manner described above and the tractor power lift mechanism operated to raise the front frame member 12 into contact with the tractor, the guide blocks 201 cooperate with the sides of the socket section 220 to guide the bar 12 into the socket member 220. Continued operation of the tractor power lift raises the pipe 12 up into locked position in the U-shaped member 220, after which the spring 232 will automatically swing the latch 225 into a position, such as that shown in FIG. 4, effectively locking the frame pipe 12 into position. Also, blocks 201 cooperate with the sides of the socket member to hold the pipe member 12 in position laterally. The pipe member 12 may be released at any time desired merely by pulling downwardly on the latch lever 229 which will swing the latch 225 upwardly and forwardly (FIG. 4) until the pipe 12 is permitted to drop to the ground, after which the lift chains 37 may be disconnected from the tractor lift arms and the tractor then driven forwardly away from the machine. In most cases, the tractor may be connected, or disconnected, in a matter of a minute or two, depending upon the skill of the operator in positioning the tractor so that when the front of the frame is raised the blocks 201 will come up against the opposite sides of the socket member 220.

While I have shown and described above the preferred structure in which the principles of this invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. The combination with a tractor having power lift means disposed generally at the rear of the tractor and actuable to raise and lower implements and the like, of a detachable agricultural implement including a frame having a transverse bar at the front over which the rear wheels of the tractor pass when the tractor is backed into position to receive the implement frame in a position generally surrounding the rear portion of the tractor, means connecting said power lift means with the implement frame at a point forwardly of the center of gravity thereof, whereby when said power lift means is actuated to raise the implement from the ground, said front transverse bar will be lifted first, and latch means carried by the tractor and adapted to engage said transverse bar when the latter is raised into locking engagement with said latch means.

2. The combination with a tractor having power lift means actuable to raise and lower implements and the like, of a detachable agricultural implement including a frame having a transverse bar at the front over which the rear wheels of the tractor pass when the tractor is backed into position to receive the implement, said transverse bar normally extending laterally outwardly beyond said tractor rear wheels, laterally inner and outer fore-and-aft extending draft bars swingably connected at their forward ends with said front transverse bar and disposed laterally inwardly and outwardly, respectively, of the tractor rear wheels, furrow forming means connected with the rear ends of said draft bars, means connecting said power lift means with the implement frame at a point forwardly of the center of gravity thereof, whereby when said power lift means is actuated to raise the implement from the ground, said front transverse bar will be lifted first, latch means carried by the tractor and adapted to engage said transverse bar when the latter is raised, a rear transverse bar connected to form a part of said frame and extending above the rear portions of said draft bars, and lost motion lift means connecting the rear portions of said draft bars with said rear transverse frame bar.

3. The combination with a tractor having power lift means actuable to raise and lower implements and the like, of a detachable agricultural implement including a frame having a transverse bar at the front over which the rear wheels of the tractor pass when the tractor is backed into position to receive the implement, a pair of laterally spaced apart fore-and-aft extending bars fixed at their forward ends to said front transverse frame bar, and a rear transverse bar connected through said fore-and-aft extending bars with said front transverse frame bar, the rear transverse bar and said front transverse frame bar extending laterally outwardly of the tractor beyond said rear tractor wheels, means connecting said power lift means with the implement frame at a point forwardly of the center of gravity thereof, whereby when said power lift means is actuated to raise the implement from the ground, said front transverse bar will be lifted first, latch means carried by the tractor and adapted to engage said transverse bar when the latter is raised, laterally inner and outer fore-and-aft extending draft bars swingably connected at their forward ends with said front transverse bar and disposed laterally inwardly and outwardly, respectively, of the tractor rear wheels, furrow forming means connected with the rear ends of said draft bars, and lift connections between the rear transverse frame bar and the rear portions of said draft bars.

4. The invention set forth in claim 3, further characterized by means connected between said rear transverse bar and said fore-and-aft extending draft bars for imposing at least a portion of the weight of the implement frame on said furrow forming means.

5. The combination with a tractor having power lift means actuable to raise and lower implements and the like, of a detachable agricultural implement including a frame having a transverse bar at the front over which the rear wheels of the tractor pass when the tractor is backed into position to receive the implement, means connecting said power lift means with the implement frame at a point forwardly of the center of gravity thereof, whereby when said power lift means is actuated to raise the implement from the ground, said front transverse bar will be lifted first, latch means carried by the tractor and adapted to engage said transverse bar when the latter is raised, said latch means including a latch frame fixed to the underside of the tractor and including a generally downwardly extending transverse bar-receiving socket, a bar-engaging detent movably connected with said latch frame and shiftable into a position to retain a bar in said socket, and means on said front transverse bar acting against said latch frame to guide said front transverse bar into said socket.

6. The combination with a tractor having power lift means actuable to raise and lower implements and the like and including an implement-receiving connection extending downwardly to a point below the body of the tractor, of an implement adapted to be passed over, at least partially, by the tractor and including a portion adapted to underlie the tractor, means on said implement to receive said downwardly extending connection, said means being located forward of the center of gravity of the implement, whereby when said connection is raised by the tractor power lift means the forward portion of the implement will be raised upwardly toward a portion of the tractor, and releasable latch means mounted on said portion of the tractor and adapted to receive the forward portion of the implement.

References Cited in the file of this patent

UNITED STATES PATENTS

| | | |
|---|---|---|
| 2,352,491 | Orelind | June 27, 1944 |
| 2,407,006 | Harris | Sept. 3, 1946 |
| 2,691,932 | Sawyer et al. | Oct. 19, 1954 |
| 2,855,875 | Oehler et al. | Oct. 14, 1958 |